United States Patent
Damlaj et al.

(10) Patent No.: US 11,477,641 B2
(45) Date of Patent: Oct. 18, 2022

(54) SYSTEM AND METHOD FOR AUTHENTICATION SESSION TRANSFER USING APPLICATION DOWNLOAD LINKS

(71) Applicant: Microsoft Technology Licensing, LLC, Redmond, WA (US)

(72) Inventors: Ibrahim A. Damlaj, Seattle, WA (US); Ariel Gordon, Mercer Island, WA (US); Sadie Elise Henry, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/588,719

(22) Filed: Sep. 30, 2019

(65) Prior Publication Data

US 2021/0099868 A1    Apr. 1, 2021

(51) Int. Cl.
| | | |
|---|---|---|
| *H04W 12/06* | (2021.01) | |
| *H04W 12/03* | (2021.01) | |
| *H04W 76/10* | (2018.01) | |
| *G06F 21/36* | (2013.01) | |
| *H04L 67/146* | (2022.01) | |
| *H04W 4/80* | (2018.01) | |

(52) U.S. Cl.
CPC .......... *H04W 12/06* (2013.01); *G06F 21/36* (2013.01); *H04L 67/146* (2013.01); *H04W 12/03* (2021.01); *H04W 76/10* (2018.02); *H04W 4/80* (2018.02)

(58) Field of Classification Search
CPC ... H04W 12/06; H04W 76/10; H04W 12/001; H04W 4/80; G06F 21/36; H04L 67/146
See application file for complete search history.

(56) References Cited

U.S. PATENT DOCUMENTS

| | | | |
|---|---|---|---|
| 9,817,646 B1* | 11/2017 | Chen | G06F 9/45529 |
| 10,200,357 B2 | 2/2019 | Grajek et al. | |
| 2006/0026260 A1* | 2/2006 | Mullen | G06F 9/44526 709/217 |

(Continued)

OTHER PUBLICATIONS

"International Search Report and Written Opinion Issued in PCT Application No. PCT/US20/044913", dated Sep. 24, 2020, 14 Pages.

*Primary Examiner* — Jinsong Hu
*Assistant Examiner* — Farideh Madani
(74) *Attorney, Agent, or Firm* — Fiala & Weaver P.L.L.C.

(57) ABSTRACT

Methods for authentication session transfer using application download links are performed by systems and devices. A user or administrator at a first device enables the user to use an application at the user's mobile device. The user or administrator provides a request for the mobile application from the first device to an identity service. The identity service generates a uniform resource locator (URL) that encodes an authentication object generated by the identity service that is specific to the user's identity, and provides the URL to the mobile device. The identity service receives the authentication object back from a browser session of the URL at the user device, and establishes an authenticated browser session of the URL using the authentication object. The identity services authenticates the user's identity for the mobile application responsive to the mobile application invoking the authenticated browser session at the user device.

20 Claims, 8 Drawing Sheets

(56) References Cited

U.S. PATENT DOCUMENTS

| | | |
|---|---|---|
| 2013/0262857 A1 | 10/2013 | Neuman et al. |
| 2016/0036809 A1 | 2/2016 | Bhimanaik |
| 2017/0244555 A1* | 8/2017 | Beiter ............... G06K 19/06028 |
| 2019/0065724 A1* | 2/2019 | Dudley .................. H04L 67/02 |
| 2019/0274043 A1* | 9/2019 | Soni .................. H04W 12/0605 |
| 2019/0306334 A1* | 10/2019 | Katoh ................ H04N 5/23229 |

* cited by examiner

SYSTEM AND METHOD FOR AUTHENTICATION SESSION TRANSFER USING APPLICATION DOWNLOAD LINKS

BACKGROUND

In the current state of the art, the process of acquisition and sign in for applications on multiple devices is disjointed. A user that signs in and runs an application on a desktop or laptop and wishes to use the mobile application version for a mobile device must acquire and install the mobile application and then, in a separate step, manually provide their sign in credentials again for the mobile application at the mobile device. This manual mobile application sign in requirement creates a drop off in mobile application usage due to inefficiencies, forgotten credentials, etc.

Some existing authentication solutions provide a download link to a mobile device to offer users ways to scan a quick response (QR) code from a desktop or laptop to complete the sign in process instead of entering credentials manually. However, this process is also disjointed with respect to the download and the QR code scanning. Additionally the QR code process is optional, and the mobile application may not know it is being invoked to scan a QR code, resulting in an untailored user experience. Other solutions attribute a mobile application first launch experience to a certain unique SMS message, but these solutions have security issues which may result in unintended recipients of authentication artifacts, and also in that authentication artifacts are provided to a third party, which is undesirable and risks user identity information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods for authentication session transfer using application download links are performed by systems and devices. A user or administrator affiliated with the user at a first device enables the user to seamlessly login and use a software application at the user's mobile device. When a user is logged in to the software application at another device, or an administrator is logged in to an associated device, an option is presented to allow installation and/or be authentication for the software application at the mobile device. The user or administrator provides a request for the software application along with information from the non-mobile device to an identity service. The identity service generates a uniform resource locator (URL) that encodes an authentication object that is associated with the identity of the user and an application download object associated with the software application, generated by the identity service, and provides the URL to the mobile device. The user is able to select the URL at the mobile device and open a browser session based on the URL, and the mobile device provides the authentication object and the application download object back to the identity service, and drops a session artifact of the authenticated browser session for the identity service. The identity service receives the objects back from the browser session of the URL at the mobile device, and establishes an authenticated browser session for the URL at the mobile device using the received-back authentication object. Another URL that is based on the application download object, is generated by the identity service and is provided to the mobile device. When a selection is made by the user at mobile device to download the software application, the application download object causes the user's browser to be redirected to a website or app store for the software application, where the software application may be downloaded/installed. With the redirection, the mobile device drops a session artifact of the authenticated browser session for the identity service. Upon selecting a login option for the now installed software application at the mobile device, the identity service picks up the session artifact. The identity services authenticates the user's identity for the software application responsive to the software application invoking the authenticated browser session, associated with the session artifact, at the mobile device.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
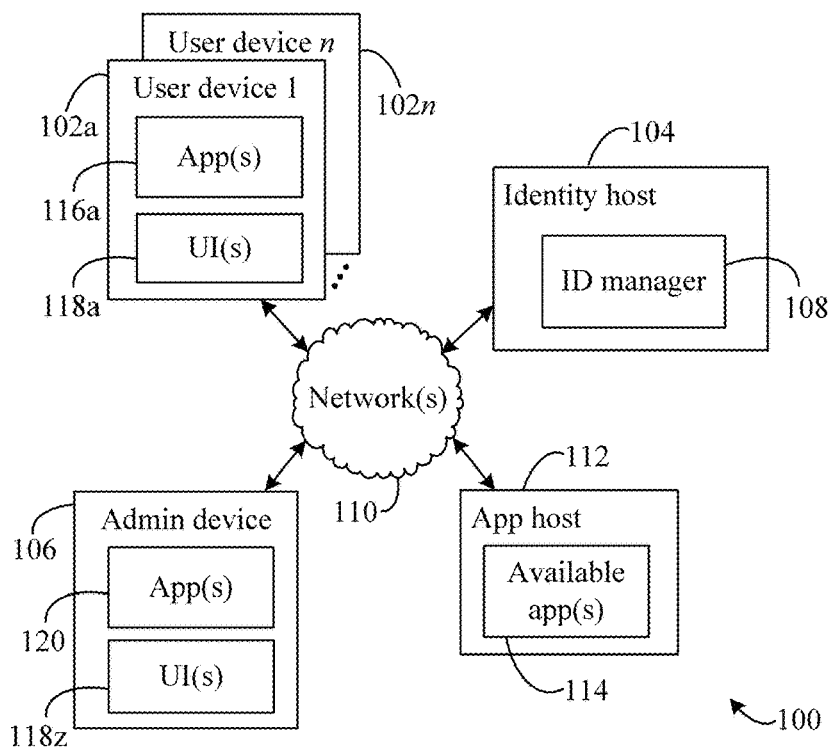
FIG. 1 shows a block diagram of a networked system for authentication session transfer using application download links, according to an example embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to be within tolerances that are acceptable for operation of the embodiment for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures and drawings described herein can be spatially arranged in any orientation or manner. Additionally, the drawings may not be provided to scale, and orientations or organization of elements of the drawings may vary in embodiments.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for authentication session transfer using application download links. Section III below describes example mobile device and computing device embodiments that may be used to implement features of the embodiments described herein. Section IV below describes additional examples and advantages, and Section V provides some concluding remarks.

II. Example Embodiments for Authentication Session Transfer Using Application Download Links Methods, systems, apparatuses, devices, and computer program products are provided herein for authentication session transfer using application download links. That is, the embodiments herein provide users with the ability to use existing login credentials and application sessions for one device to be automatically logged in to the application at another device. In other words, embodiments enable an identity service to send an application (or "app") download link to a user device and transfer an existing, authenticated application session across devices using a single, seamless process. In the context of the embodiments herein, an identity service may be synonymous with an authentication service or a central authentication service, such as services utilized by Azure® Active Directory® from Microsoft Corporation of Redmond, Wash., or other account service hosts (e.g., email, productivity services, social media services, etc.).

For example, a user, or an administrator that is affiliated with the user, at a non-mobile device such as a desktop computer, or even a laptop or tablet, may enable the user to seamlessly login and use a software application at the user's mobile device such a smartphone. When a user is logged in to the software application at another device such as a non-mobile device, or an administrator is logged in to an associated device, an option may be presented via display to allow installation and/or authentication for the software application at the mobile device, according to embodiments.

The user or administrator may provide a request for the software application along with information from the non-mobile device to an identity service via a selectable option in a user interface (UI). The identity service receives the request and generates a uniform resource locator (URL) that encodes an authentication object that is associated with the identity of the user and an application download object associated with the software application, generated by the identity service. The generated URL is then provided to the mobile device of the user via text message, email, scannable QR code, etc.

The user is then able to select the URL at the mobile device and open a browser session in a browser based on the URL. The mobile device provides the authentication object and the application download object back to the identity service. The identity service receives the objects back from the browser session of the URL at the mobile device, and establishes an authenticated browser session for the URL at the mobile device using the received-back authentication object. Another URL that is based on the application download object, is generated by the identity service and is provided to the mobile device. When a selection is made by the user at mobile device to download the software application, the application download object causes the user's browser to be redirected to a website or app store for the software application, where the software application may be downloaded/installed.

With the redirection, the mobile device provides a session artifact (or authentication artifact), such as but not limited to, dropping a cookie of the authenticated browser session for the identity service. Cookies, as will be understood by a person of skill in the relevant art(s) having the benefit of this disclosure, may contain information related to the identity of the user, user preferences for specific accounts/websites, indication of authenticated browser sessions, and/or the like. It should be noted that while embodiments herein may be described in the context of cookie usage for brevity and illustration, other types of session artifacts may be used to convey such information, e.g., hypertext markup language (HTML) local storage, etc., and the embodiments herein are not limited to the use of cookies. Upon selecting a login option for the now installed software application at the mobile device, the identity service gets the session artifact (e.g., picks up the cookie). The identity services authenticates the user's identity for the software application responsive to the software application invoking the authenticated browser session, associated with the session artifact, at the mobile device.

Embodiments herein also provide for the ability to generate and provide authentication objects that are configured to be utilized directly by software applications, including those to be acquired and those already acquired, without requiring the establishment of authenticated browser session. For example, the intent of the user may utilized in conjunction with authentication objects to be used directly by software applications for authentication thereto.

In some embodiments, an authentication application may be acquired and accessed by a user according to the process described above. In turn, the authentication application may be utilized by the user for acquiring and/or automatic authentication of other, different software applications at the mobile device.

Simply put, the embodiments described herein provide for the ability to acquire and automatically authenticate a user for a software application at a user device via authentication session transfer using application download links without requiring the user to manually enter their login credentials. Moreover, the authentication described herein is performed under zero trust; that is, no third party has access to or is provided with the authentication artifacts/objects of the user. Accordingly, the authentication process is more efficient and personal/identifying information is more secure.

The described embodiments may be applicable across a number of contexts, including, but not limited to, mobile app upsells for software applications used on desktop computers or the like, first line workers, enterprise users, families, individual user software application accesses, etc. As a non-limiting example, the usage of mobile usage of software applications may be improved, e.g., for smartphones. In some cases, a user using an app on a desktop or tablet computer may also desire to use the app on their phone. The user may be enabled to enter or select their phone number, and can be provided with a download link to their phone that also signs them into the same account they are currently signed into on their desktop or tablet computer. The user is thus provided with access to the app on the phone without entering their credentials on the phone.

As another non-limiting example, first line worker users or enterprise users may need to acquire and access a software application on the user's first day of work. An administrator affiliated with the user, e.g., an administrator of the user's company, can use this mechanism to send the worker a special link for the software application that will also sign the worker into their account on the phone. The administrator never has to give the first line worker a username, password, or other credentials. Similarly, a parent of a family may be enabled to provide access to a software application to a child in this way, as may a professor-student(s) affiliation, etc.

In other words, the embodiments disclosed herein provide ways for users to transfer existing, authenticated software application sessions to other devices without the need to enter or disclose authenticating information. These and further embodiments are described in greater detail as follows.

Systems and devices may be configured in various ways for authentication session transfer using application download links. For instance, FIG. 1 is a block diagram of a computing system 100 ("system 100" hereinafter), according to embodiments. System 100 is configured to enable authentication session transfer using application download links, according to embodiments. As shown in FIG. 1, system 100 includes one or more user devices shown as a user device 102*a* through a user device 102*n*, an identity host 104, an administrator device 106, and an application host 112, which may communicate with each other over a network 110. It should be noted that any numbers of user devices, administrator devices, application hosts, and/or identity hosts may be present in various embodiments. Additionally, any combination of the components illustrated in FIG. 1 may be present in system 100, according to embodiments.

As noted above, user device 102*a* through user device 102*n*, administrator device 106, application host 112, and ML host 104 may be communicatively coupled via network 110. Network 110 may comprise any type of communication links that connect computing devices and servers such as, but not limited to, the Internet, wired or wireless networks and portions thereof, point-to-point connections, local area networks, enterprise networks, and/or the like.

Identity host 104 may comprise one or more server computers or computing devices, which may include one or more distributed or "cloud-based" servers. In embodiments, identity host 104 may be associated with, or may be a part of, a cloud-based service platform such as Microsoft® Azure® from Microsoft Corporation of Redmond, Wash. Identity host 104 may include an identity service, or an authenticator service, which may comprise an identity (ID) manager 108. User devices such as user device 102*a* through user device 102*n*, as well as administrator device 106 may be configured to provide information associated with authentication session transfer using application download links to identity host 104, and ID manager 108, via network 110.

ID manager 108 may be configured to receive requests associated with authentication session transfer using application download links from user devices and/or administrator devices to authenticate users for applications at their respective devices. In performance thereof, ID manager 108 may be configured generate URLs that encode authentication objects and/or software application download objects and/or authentication objects, that can be utilized by users/user devices for the embodiments herein. ID manager 108 may also be configured to generate the objects encoded by the URLs. ID manager 108 may be configured to authenticate a user for a software application based on responses from the user's device and information included therein, as described in further detail below.

ID manager 108 may be implemented in hardware, hardware combined with one or both of software and/or firmware, and/or as program instructions encoded on computer-readable storage media, and may be configured to perform any functions and/or operations described herein for authentication session transfer using application download links.

It should be noted that as described herein, embodiments of identity host 104 are applicable to any type of system that communicates with client/administrator devices over a network. One example noted above is where identity host 104 comprises a "cloud" implementation, application, or service in a network architecture/platform. A cloud platform may include a networked set of computing resources, including servers, routers, etc., that are configurable, shareable, provide data security, and are accessible over a network such as the Internet. Cloud applications/services such as for identity services and authentication session transfer using application download links may run on these computing resources, often atop operating systems that run on the resources, for entities that access the applications/services over the network. A cloud platform may support multi-tenancy, where cloud platform-based software services multiple tenants, with each tenant including one or more users who share common access to software services of the cloud platform. Furthermore, a cloud platform may support hypervisors implemented as hardware, software, and/or firmware that run virtual machines (emulated computer systems, including operating systems) for tenants. A hypervisor presents a virtual operating platform for tenants.

Application store 112 may be a stand-alone storage system, a hosted website, and/or may be internally or externally associated with identity host 104, in embodiments. Application store 112 may be configured to store and/or provide applications, e.g., available application(s) 114, to user devices for installation. In one example, a software application download object, encoded by a URL and provided to a user's mobile device, may redirect a browser of the device to an endpoint, application store 112. Application store 112 may be communicatively coupled to other systems and/or devices via network 110. That is, application store 112 may be any type of system, storage device, and/or array of devices, for storing and providing applications for installation. Additional instances, types, hosts, etc., of application store 112 may be included in addition to, or in lieu of, the embodiment shown.

User devices such as user device 102*a* through user device 102*n*, and/or administrator devices such as administrator device 106, may be any type of computing device or computing system, including a terminal, a personal computer, a laptop computer, a tablet device, a smartphone, a personal digital assistant, a game console or gaming device, a television, and/or the like that may be utilized by users/administrators to request, access, and/or use software applications, and request authentication session transfer using application download links, such as through interactions with a user interface(s) (e.g., UI(s) 118*a* through UI(s) 118*n* (not visible) and/or UI(s) 118*z*. In embodiments, user device 102*a* through user device 102*n*, as well as administrator device 106, may each comprise various input/output (I/O) modalities for input entry by users/administrators and display of consoles, websites, applications, etc., via respective UIs thereof.

Client and administrator devices described herein may be configured to execute browsers such as web browsers as well as other software applications (including software tools). Interactions therewith, e.g., via UIs, initiate and/or facilitate authentication session transfer using application download links by ID manager 108. In embodiments, application(s) 116*a* through application(s) 116*n* (not visible), as well as application(s) 120, may be software applications from application host 112, may be native to an operating system of a respective client/administrator device, or may be otherwise acquired and installed. Such applications may require authentication via user credentials for access thereto, and/or may be utilized for the embodiments described herein. In embodiments, an authentication application as described herein may be on of application(s) 116*a* through application(s) 116*n*.

Figure 2:
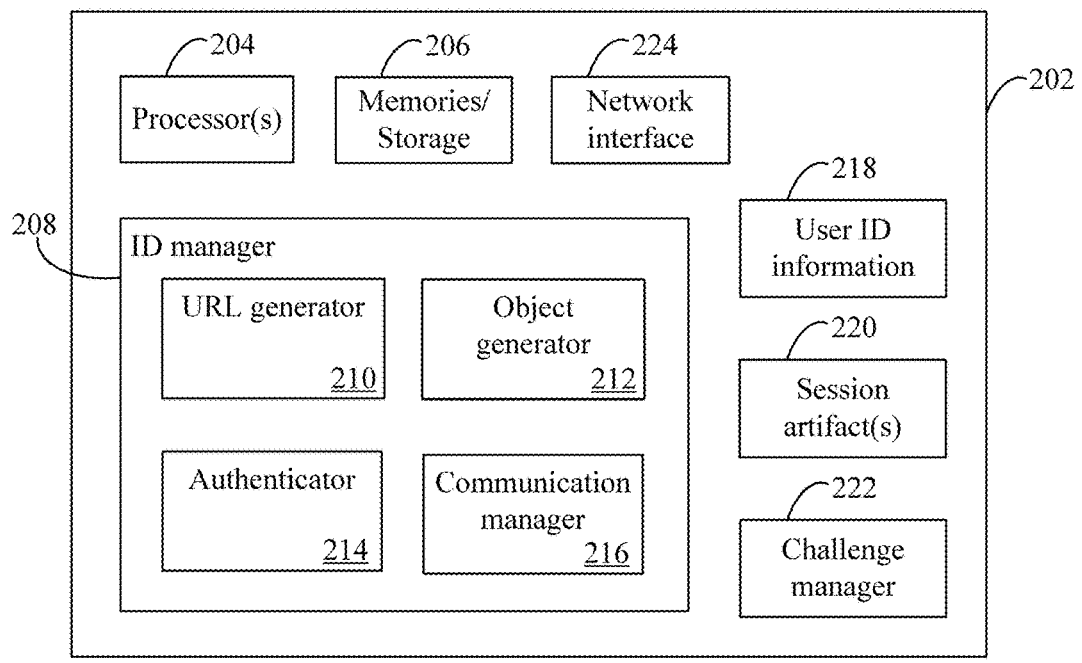
FIG. 2 shows a block diagram of a computing system for authentication session transfer using application download links, according to an example embodiment.

Accordingly, a system such as system 100 of FIG. 1 and/or an identity host such as identity host 104 may be configured in various ways for authentication session transfer using application download links based in part on requests and information provided by client and/or administrator devices. For example, FIG. 2 is a block diagram of a system 200 configured for authentication session transfer using application download links. System 200 may be an embodiment of system 100 of FIG. 1, e.g., identity host 104. System 200 is described as follows.

System 200 includes a computing device 202, which may be an embodiment of identity host 1024 of FIG. 1, and may be any type of computer or computing device, as mentioned elsewhere herein, or as otherwise known. As shown in FIG. 2, system 200 and computing device 202 include one or more of a processor ("processor") 204, one or more of a memory and/or other physical storage device ("memory") 206, one or more network interfaces ("network interface") 224, and an ID manager 208 that may be an embodiment of ID manager 108 of FIG. 1. System 200 may also include additional components (not shown for brevity and illustrative clarity) including, but not limited to, components and subcomponents of other devices and/or systems herein, as well as those described below with respect to FIGS. 14 and 15, such as an operating system.

Processor 204 and memory 206 may respectively be any type of processor circuit and memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of ID manager 208, which may be implemented as computer program instructions for authentication session transfer using application download links, etc., as described herein. Memory 206 is configured to store such computer program instructions/code, as well as to store other information and data described in this disclosure including, without limitation, user ID information 218 (e.g., user names, passwords, aliases, phone numbers, email addresses, information for different types of accounts and/or service accesses, registered devices, etc.), session artifact(s) 220, and/or the like.

Network interface 224 may be any type or number of wired and/or wireless network adapter, modem, etc., configured to enable system 200 to communicate with other devices over a network, such as communications between system 200 and other devices utilized in a network as described herein (e.g., user device 102*a* through user device 102*n*, and/or administrator device 112) over a network such as network 110 as described above with respect to FIG. 1.

ID manager 208 may include a plurality of components for performing the functions and operations described herein for authentication session transfer using application download links. As shown, ID manager 208 includes a URL generator 210, an object generator 212, an authenticator 214, and a communication manager 216. While shown separately for illustrative clarity, in embodiments, one or more of URL generator 210, object generator 212, authenticator 214, and/or communication manager 216, may be combined together and/or as a part of other components of system 200. In some embodiments, less than all of the components of ID manager 208 illustrated in FIG. 2 may be included. In software implementations, one or more components of ID manager 208 may be stored in memory 206 and may be executed by processor 204.

URL generator 210 may be configured to generate URLs that encode objects for authentication and/or software application downloads. Generated URLs may also include a host, website, or other identifier associated with an identity service, an application website/store, and/or the like. URL generator 210 may generate URLs based at least on information received in a request from a device associated with a user or administrator, including, without limitation, a user name and/or alias, a user phone number, a user email address, an identifier associated with a software application, and/or the like. A URL may also be generated based on a software application download object.

Object generator 212 may be configured to generate objects, as described herein. For example, object generator may be configured to generate objects for authentication and/or software application downloads that are encoded by URL generator 210. In embodiments, authentication objects may comprise one or more tokens, such as flow tokens or transfer tokens that identify a user and provide a validation of the user's identity. Objects may be generated based at least on the information provided in the request, described above. Software application download objects may be generated by object generator 212 and may include a host, website, or an application website/store from which the software application requested may be obtained, as well as a form of an identifier for a software application the user wishes to acquire and/or access according to the embodiments herein.

Authenticator 214 may be configured to authenticate users for accounts and/or to authenticate browser session at user devices. User authentication may be performed based on authentication objects provided back by a user device, such as flow or transfer tokens, although different mechanisms other than tokens for authentication objects are also contemplated herein. An authenticated user may then have a browser session at their user device authenticated by authenticator 214. An authentication object, e.g., a token, may comprise a signed assertion associated with the user, signifying their intent/request to use the software application on another device, and/or a declared identity confirmation associated with the user. Authenticator 214 may be configured to authenticate users for software applications initialized at a user device. Such authentication may be performed based on receiving a session artifact, such as a cookie or HTML local storage, associated with an authenticated browser session, or may be based on an authentication application executing at the user device.

Authenticator 214 may operate in conjunction with a challenge manager 222 which may be configured to provide a challenge for a two-step authentication process. In embodiments, challenge manager 222 may be configured to provide a code or link or the like to a user device requiring a proper response for completing authentication subsequent to objects being provided back from the user device.

Communication manager 216 may be configured to facilitate communications between system 200 and its components, and user/administrator devices described herein, e.g., via network interface 224. That is, while various embodiments herein may be described as having components of system 200 and ID manager 208 receiving and providing communications, URLs, objects, requests, etc., the reception and provision thereof may take place with communication manager 216 configured to operate as an intermediary between system 200 and ID manager 208, and other devices, over a network.

Accordingly, ID manager 208 may operate in various ways to enable authentication session transfer using application download links. Additional details regarding ID manager 208 and its components are provided below.

Figure 3:
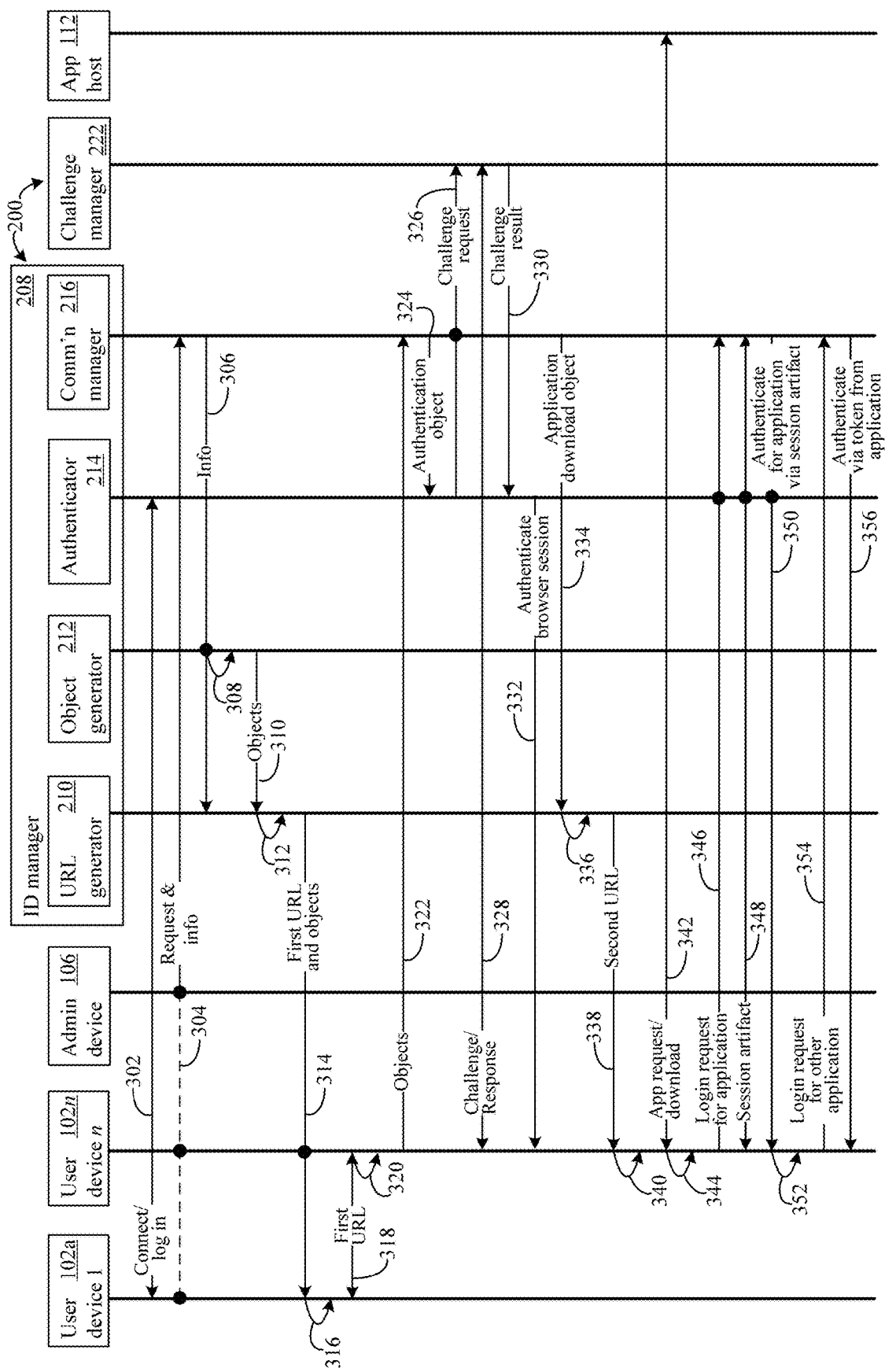
FIG. 3 shows a flow diagram for the systems in FIGS. 1 and 2 for authentication session transfer using application download links, in accordance with an example embodiment.

For instance, FIG. 3 shows a flow diagram 300 for authentication session transfer using application download links, according to an example embodiment. System 200 and ID manager 208 may operate according to flow diagram 300, in an embodiment. Further structural and operational examples will be apparent to persons skilled in the relevant art(s) based on the following description. Flow diagram 300 is described as follows with respect to system 100 of FIG. 1 and system 200 of FIG. 2.

Communications described herein for flow diagram 300 between components of system 200 of FIG. 2 (which may be an embodiment of identity host 104 of FIG. 1) and other systems/devices described with respect to FIG. 1 may be performed over network 110.

Flow diagram 300 begins at step 302. In step 302, a user signs in to a software application initialized on user device 102*a* by connecting to system 200 and authenticator 214 and providing user credentials (either as stored credentials or by entering credential information. In this example, user device 102*a* may represent a desktop computer or other non-mobile device. System 200 and authenticator 214 authenticate the user for the application at user device 102*a* based on the credentials by providing a confirmation thereof back to user device 102*a* in step 302. Thus, the user has an authenticated instance of the software application now executing on user device 102*a*. Authenticator 214 may provide an authentication object or other artifact back to user device 102*a* as, or with, the return confirmation of authentication in step 302.

As part of step 302, and after authentication as described above, the executing software application, or system 200, may cause a selectable prompt to be displayed to the user of user device 102*a* to install an instance of the software application at another device of, or associated with, the user, such as a smartphone or mobile phone. In this example, this other device is shown in FIG. 3 as user device 102*n*. In embodiments, the user may be given selectable options for providing a request to acquire the instance of the software application at user device 102*n* via a web link. The request may include, or be based on, information associated with the user, including user identity information, credentials, etc., and may include the mechanism for delivery of the web link, such as but not limited to, by communication identifier, e.g., text message to a phone number associated with user device 102*n* or by email to an alias or username for an account of the user accessible via user device 102*n*, by quick response (QR) code, other visual pairing mechanisms, or other formats sent to user device 102*a*, etc. A web link via text or email message may include a selectable link that includes a URL. A QR code may be scanned by user device 102*n* to acquire the web link, while other formats may include data for the web link to be transmitted via a sub-audio frequency communication, a near-field communication (NFC), a radio frequency (RF) communication, a Bluetooth communication, and/or the like. In other embodiments, a user may enter rather than select a preferred method of receiving. Information associated with a request may also include an identifier for the software application to be acquired.

In step 304, the request and associated information may be provided from user device 102*a* to system 200 and communication manager 216. In embodiments, as shown in flow diagram 300, the request and information of step 304 being provided to communication manager 216 of system 200 may be provided from the second/other user device (user device 102*n*) or from administrator device 106. By enabling a user to request the software application from a first device to be installed and automatically authenticated at a second device, or by enabling an administrator to request the software application, the user can choose or signify her intent via the request to use same software application on the different device (or in the case of the administrator, intent is provided therefrom), and the embodiments herein provide the automatic authentication for this process.

In step 306, the information associated with the request may be provided to object generator 212 and to URL generator 210 from communication manager 216. In step 308, object generator 212 may generate an authentication object and/or a software application download object based at least on the information provided. For example, an authentication object associated with the identity of the user may be generated by object generator 212 based on user identity data/credentials acquired in step 302 or with the information associated with the request that identifies the user. As previously noted, the authentication object may be a token, such as a flow token or transfer token or the like, and may include a signed assertion associated with the user and/or a declared identity confirmation associated with the user. A software application download object may be generated by object generator 212 based on the identifier of the software application to be acquired, and may be configured for utilization in creating an application download link to an endpoint, for acquiring the software application, on a user device, e.g., user device 102*n*.

In step 310, generated authentication objects and software application download objects are provided to URL generator 210. In step 312, URL generator 210 is configured to generate a first URL that encodes the provided objects. The URL may be generated to include a designation of a portal, landing, or login page of a service (e.g., an authentication portion of the service) associated with the software application or with the identity service, a payload, and/or a sub-payload, where payloads may comprise encoded versions/representations of the objects. It is contemplated herein that different types of encoding may be applicable to the embodiments herein. In step 314, the first URL with encoded objects is provided to user device 102*n* from URL generator 210. It should be noted that while not shown for illustrative clarity, in some embodiments, URL generator 210 may provide the first URL to communication manager 216 which may in turn provide the first URL to user device 102*n*.

Additionally, as noted above, the first URL and encoded objects may be provided as a QR code or other format (e.g., information formatted for sub-audio frequencies, NFC, Bluetooth, etc.) to user device 102*a* from which user device 102*n* may obtain the first URL and encoded authentication/software application download objects. In step 316, user device 102*a* may receive the first URL and encoded objects in one of these formats, and in the case of a QR code or other visual pairing mechanism, display the QR code or other visual pairing format on a display via a UI for scanning by the user. In the case of a sub-audio frequencies, NFC, and/or Bluetooth information transfers, in step 316, user device 102*a* may prepare the information for transfer to user device 102*n* by a wireless mechanism.

In step 318, either of user device 102*n* or user device 102*a* may initiate a transfer of the first URL via a wireless mechanism, and user device 102*n* obtains the first URL in such a transfer. In the case of a visual pairing, in step 318 user device 102*n* scans the display of user device 102*a* to obtain the first URL.

In some embodiments, the software application to be acquired by a user device may consume, obtain, or otherwise use an authentication object directly, e.g., via "intents" for Android® use cases, without utilizing an authenticated browser session as described in various steps below and elsewhere herein. In such embodiments, flow diagram 300 may proceed without performing one or more steps, or portions thereof, described below with respect to establishing an authenticated browser session and the use thereof to authenticate a user.

In step 320, the user selects or activates the provided web link having the first URL via user device 102*n*. As noted above, different mechanisms of provision and acquisition of the web link and first URL are contemplated herein. By whichever mechanism is utilized, a first browser session for the first URL is instantiated responsive to the activation at user device 102*n*, and the browser navigates to the URL. The first browser session may be instantiated using a default browser for system browser for the operating system of user device 102*n*. From the first browser session, the authentication object and the software application download object are provided back to system 200 and ID manager 208 in step 322. In embodiments, the authentication object and the software application download object are received by communication manager 216.

In step 324, communication manager 216 provides the received-back authentication object to authenticator 214 which validates or confirms the authentication object. In some embodiments, an optional secondary or second-factor authentication/challenge may be utilized. For instance, a challenge may be issued based on a risk determination associated with the communication identifier used to provide the web link and first URL to the user (e.g. if the URL was sent to a user's verified phone number or not). If the risk determination indicates a challenge is required/desired, the user could be asked to provide additional verification (e.g. a knowledge test or a pairing code) before verification is completed and an authentication session is created in the browser. In such cases, authenticator 214 and/or communication manager 216 may be configured to provide a challenge request to challenge manager 222, as shown in step 326. Challenge manager 222 may determine which type of challenge to issue based on user account information and/or preferences, and may provide the challenge to user device 102*n* and receive a challenge response in step 328. As previously noted, challenge manager 222 may provide the challenge to communication manager 216 which in turn may provide the challenge to and receive the challenge response from user device 102*n*. In step 330, the challenge response is verified as correct or incorrect, and a challenge result is provided to authenticator 214. If the challenge result indicates an incorrect response, another challenge may be provided, or the process may terminate or restart. If, however, the challenge result indicates a correct response, or when the optional challenge steps are not performed, flow diagram 300 proceeds to step 332.

In step 332, authenticator 214 establishes an authenticated browser session with user device 102*n* based at least on the authentication object. In embodiments, establishing an authenticated browser session with user device 102*n* comprises authenticating the first browser session or comprises initiating a new browser session that is authenticated.

In step 334, the received-back software application download object from step 322 is provided to URL generator 210. As noted above, the software application download object enables creation of an application download link with a second URL to an endpoint for acquiring the software application at a user device, e.g., user device 102*n*. Accordingly, in step 336, URL generator 210 is configured to generate the second URL, e.g., for an application acquisition endpoint, based at least on the application download object, that specifies a redirection to a second browser session at user device 102*n* for a download website or an application store for the software application. In step 338, the second URL is provided to user device 102*n*. In embodiments, the second URL may specify the second browser session to be in the same browser as the first browser session or in a different browser.

In step 340, user device 102*n* initiates the second browser session based on the second URL received in step 338. In some embodiments, user device 102*n* may prompt the user in association with the second browser session to consent to the redirection specified by the second URL for the software application acquisition endpoint. In association with the initiation of the second browser session and the redirect, user device 102*n* is configured to provide a session artifact, e.g., drop a cookie, for the authenticated browser session established in step 332. The redirection to the endpoint for the second browser session is performed at user device 102*n* based on the second URL in step 340.

In step 342, the endpoint is provided to the user in the second browser session, and the user requests to acquire, download, and/or install the software application at user device 102*n* via a UI and the endpoint. The software application, or an installation package therefor, is provided to user device 102*n*, and installation is initiated. In step 344, the installation is performed by user device 102*n*. Subsequent to installation, the user may initialize execution of the software application at user device 102*n* which may cause a login challenge or selectable option to begin login authentication to be displayed to the user for access to the software application. Additionally, a selectable option may be presented to the user to verify the user's intent/consent to perform the automatic authentication and session transfer described herein.

In step 346, the user selects the appropriate choices to sign in to the software application and consent to the automatic authentication and session transfer, and user device 102*n* provides a login request to authenticator 214 (or to communication manager 216 which in turn provides the login request to authenticator 214). In step 348, the session artifact for the authenticated browser session is provided, e.g., a cookie dropped, in step 340 is picked up by authenticator 214, and the user is authenticated for access to the software application for user device 102*n* based on the session artifact. In some embodiments, the authentication object may be utilized with the intent of the user in place of the session artifact, as described herein. In step 350, an indication of the authentication based on the session artifact or the intent/authentication object is provided to user device 102*n*, and at step 352, the user is signed in to the software application at user device 102*n* using the account associated with the software application (e.g., the account used to access the software application at user device 102*a*).

In embodiments, the software application may be an authentication application configured to be utilized by the user for acquiring and/or automatic authentication of other, different software applications at the mobile device. In such cases, the authentication application may be acquired and the user automatically authenticated according to the embodiments herein. Once the user has been authenticated and has accessed the authentication application at user device 102*n*, the user may authenticate other software applications at user device 102*n* via the authentication application. In some embodiments, the authentication application may be used to authenticate users for newly-acquired software applications, as described above in flow diagram 300, in addition to, or in lieu of, session artifacts such as cookies, HTML local storage, etc. In other embodiments, the authentication application may be used to authenticate users for software applications already installed at user device 102*n* that require authentication for access thereto.

In step 354, the user may initiate another software application at user device 102*n*, and provide a login request for the other application to system 200 (e.g., to communication manager 216 and/or authenticator 214). In embodiments, the authentication application may provide credentials and/or an authentication object, e.g., a token or other object/artifact, with the login request, while in other embodiments, system 200 may provide a counter-request for authentication from the authentication application response to receiving the request. In either case, on receiving the credentials and/or an authentication object from user device 102*n* for the other software application, authenticator 214 may validate the user for authentication to the other software application and provide indicia thereof in step 356 back to user device 102*n* to allow the user access.

Accordingly, the embodiments herein provide for authentication session transfer using application download links based in part on requests and information provided by client and/or administrator devices. The following flowcharts in FIGS. 4-6 describe variations of the above embodiments with respect to operations performed by identity host 104 of FIG. 1 and/or system 200 of FIG. 2.

Figure 4:
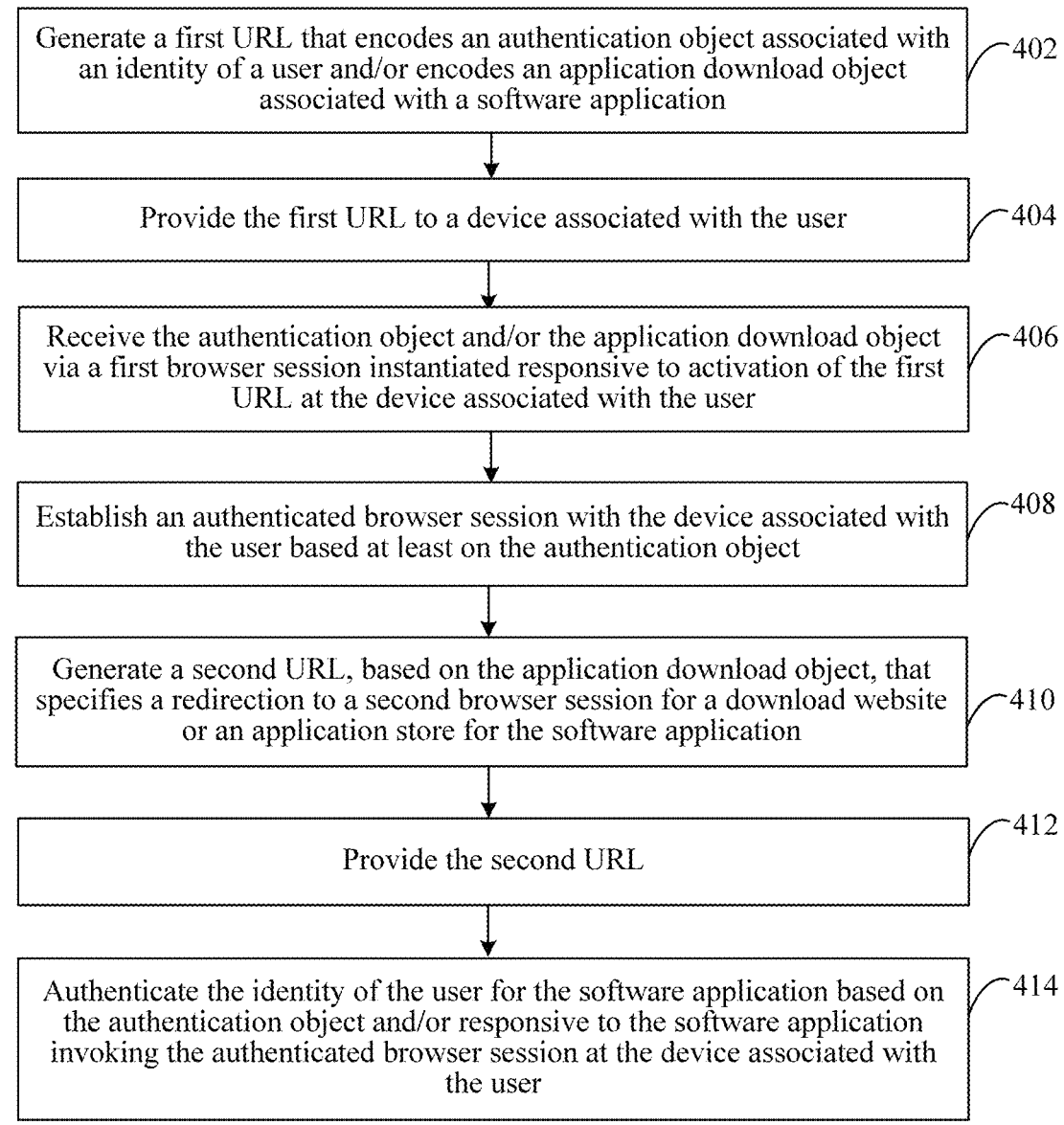
FIG. 4 shows a flowchart for authentication session transfer using application download links, in accordance with an example embodiment.

FIG. 4 shows a flowchart 400 for authentication session transfer using application download links, according to an example embodiment. Flowchart 400 may be a further embodiment of flow diagram 300 of FIG. 3. Flowchart 400 may be performed by system 200 of FIG. 2 and is described with respect thereto. Further structural and operational examples will be apparent to persons skilled in the relevant art(s) based on the following description.

Flowchart 400 is directed to an embodiment in which a user that is signed in to a software application on one user device (e.g., a desktop computer) desires to acquire the software application for another user device (e.g., a mobile device or smartphone). Flowchart 400 begins at step 402 and is described as follows.

In step 402, a first URL is generated that encodes an authentication object associated with an identity of a user and encodes an application download object associated with the software application. For example, URL generator 210 of system 200 in FIG. 2 is configured to generate the first URL and encode objects therein. The first URL may include a host or server name associated with an account of the user utilized to login to the software application at another user device. The objects may be generated by object generator 212 based on a request to acquire the software application and information associated with the request.

In step 404, the first URL is provided to a device associated with the user. The first URL may be provided to a user device as a web link, QR code, and/or the like, via a messaging service, email service, etc. For instance, the user device to which the first URL is provided may be the user device at which the software application is desired for installation and subsequent use, in embodiments. In other embodiments, the user device may be a different device at which the user is currently authenticated for and executing an instance of the software application. Web links, QR codes, etc., may be "pushed" to user devices in embodiments, may be provided responsive to user requests, or may be "pulled" by user devices, in embodiments.

In step 406, the authentication object and the application download object are received via a first browser session instantiated responsive to activation of the first URL at the device associated with the user. For example, the objects provided to the user device in step 402 may be provided back to system 200 via the first browser session for the first URL, based on activation of the first URL, in order to perform authentication of the user at the user device and generation of a second URL directed to an endpoint for acquisition of the software application. Authenticator 214 of system 200 is configured to authenticate the user at the user device based on the authentication object provided back by the user device.

In step 408, an authenticated browser session is established with the device associated with the user based at least on the authentication object. For instance, the authentication of the user based on the authentication object described with respect to step 406 may cause authenticator 214 to establish an authenticated browser session at the user device which may be later used by the software application, after download, to authenticate the user for the software application itself. In embodiments, establishing the authenticated browser session may comprise authenticating the first browser session or may comprise initiating a new browser session that is authenticated.

In step 410, a second URL is generated, based on the application download object, that specifies a redirection to a second browser session for a download website or an application store for the software application. For example, URL generator 210 may be configured to generate the second URL based on the software application download object provided back from the user device. The second URL may specify an endpoint from which the software application is to be obtained by the user device and cause a redirection of a second browser session at the user device to the endpoint which may be a website or application store.

In step 412, the second URL is provided. For instance, the second URL generated in step 410 may be provided to the user device from which the objects were returned back (i.e., the user device at which user desires to acquire and access the software application. In embodiments, the second URL is provided from system 200 to the user device, e.g., via URL generator 210 and/or communication manager 216.

In step 414, the identity of the user is authenticated for the software application responsive to the software application invoking the authenticated browser session at the device associated with the user. For example, authenticator 214 is configured to authenticate the identity of the user for the software application. In embodiments, the authenticated browser session may be invoked, e.g., for a redirection per the second URL, and a session artifact may be provided e.g., a cookie may be dropped. Authenticator 214 is configured to get the session artifact, e.g., pick up the dropped cookie, as a basis for authenticating the identity of the user for the software application at the user device.

Figure 5:
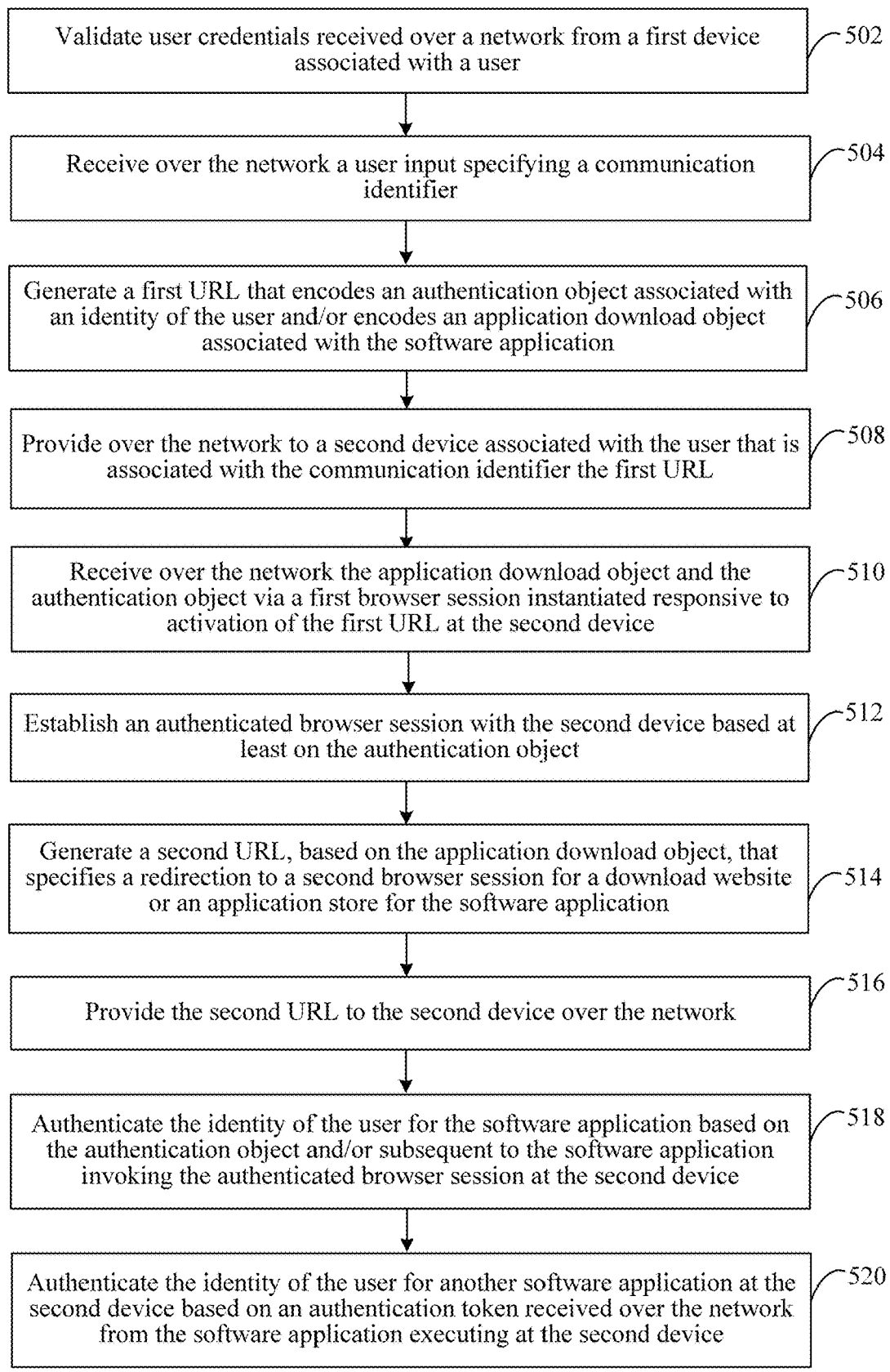
FIG. 5 shows a flowchart for authentication session transfer using application download links, in accordance with an example embodiment.

FIG. 5 shows a flowchart 500 for authentication session transfer using application download links, according to an example embodiment. Flowchart 500 may be a further embodiment of flow diagram 300 of FIG. 3. Flowchart 500 may be performed by system 200 of FIG. 2 and is described with respect thereto. Further structural and operational examples will be apparent to persons skilled in the relevant art(s) based on the following description.

Flowchart 500 is directed to an embodiment in which a user that is signed in to an authentication or identity service/application on one user device (e.g., a portal, landing, or login page of a service (or an authentication portion of the service) (e.g., via a desktop computer) desires to acquire an associated authentication application for another user device (e.g., a mobile device or smartphone). Flowchart 500 begins at step 502 and is described as follows.

In step 502, user credentials received over a network from a first device associated with a user are validated. For example, authenticator 214 may receive over network 110 user credentials from user device 102a to authenticate the user to sign in to an authentication or identity service/application associated with system 200. Authenticator 214 may be configured to validate the user credentials and allow the user to sign in.

In step 504, a user input specifying a communication identifier is received over the network. For instance, system 200 may receive a request from a user at the first user device for a software application, e.g., an authentication application, where the request includes information specifying a communication identifier associated with the user and/or the device with which the user desires to obtain the software application. In some embodiments, the first user device may be specified in the request. Communication identifiers can include, without limitation, a phone number associated with a user device for a text message, an alias or username for an account of the user (e.g., email or other communication/messaging applications) accessible via the second user device, and/or the like, in which web links, QR codes, other files/attachments for a sub-audio frequencies, NFC, and/or Bluetooth communications may be provided to the first user device (e.g., either specifically or via the second user device.

In step 506, a first URL is generated that encodes an authentication object associated with an identity of a user and encodes an application download object associated with the software application. For example, URL generator 210 of system 200 in FIG. 2 is configured to generate the first URL and encode objects therein. The first URL may include a host or server name associated with an account of the user utilized to login to the software application at another user device, here in this example, the second user device. The objects may be generated by object generator 212 based on the request with the user input specifying the communication identifier to acquire the software application and information associated with the request.

In step 508, the first URL is provided over the network, to a second device associated with the user associated with the communication identifier, to a device associated with the user. The first URL may be provided to a second user device that is different from the first user device (as in step 502) as a web link, QR code, and/or the like, via a messaging service, email service, etc., over network 110. For instance, the user device to which the first URL is provided may be the second user device at which the software application is desired for installation and subsequent use, in embodiments. In other embodiments, the user device may be a different device, e.g., the first device at which the user is currently authenticated for and executing an instance of the software application.

In step 510, the application download object and the authentication object are received over the network via a first browser session instantiated responsive to activation of the first URL at the second device. For example, the objects provided to the second user device in step 508 may be provided back to system 200 via the first browser session for the first URL, based on activation of the first URL, in order to perform authentication of the user at the second user device and generation of a second URL directed to an endpoint for acquisition of the software application. Authenticator 214 of system 200 is configured to authenticate the user at the second user device based on the authentication object provided back by the second user device.

In step 512, an authenticated browser session is established with the second device associated with the user based at least on the authentication object. For instance, the authentication of the user based on the authentication object described with respect to step 510 may cause authenticator 214 to establish an authenticated browser session at the second user device which may be later used by the software application, after download, to authenticate the user for the software application itself. In embodiments, establishing the authenticated browser session may comprise authenticating the first browser session or may comprise initiating a new browser session that is authenticated.

In step 514, a second URL is generated, based on the application download object, that specifies a redirection to a second browser session for a download website or an application store for the software application. For example, URL generator 210 may be configured to generate the second URL based on the software application download object provided back from the second user device. The second URL may specify an endpoint from which the software application is to be obtained by the second user device and cause a redirection of a second browser session at the second user device to the endpoint which may be a website or application store.

In step 516, the second URL is provided to the second device over the network. For instance, the second URL generated in step 514 may be provided to the user device from which the objects were returned back (i.e., the second user device at which user desires to acquire and access the software application). In embodiments, the second URL is provided from system 200 to the second user device, e.g., via URL generator 210 and/or communication manager 216.

In step 518, the identity of the user is authenticated for the software application subsequent to the software application invoking the authenticated browser session at the second device. For example, authenticator 214 is configured to authenticate the identity of the user for the software application. In embodiments, the authenticated browser session may be invoked, e.g., for a redirection per the second URL, and a session artifact may be provided, e.g., a cookie may be dropped. Authenticator 214 is configured to get the session artifact, e.g., pick up the dropped cookie, as a basis for authenticating the identity of the user for the software application at the second user device.

In step 520, the identity of the user is authenticated for another software application at the second device based on an authentication token received over the network from the software application executing at the second device. For instance, the software application now installed and authenticated for the user, may be an authentication application. When the user is authenticated for access to the software application for the second user device based on the session artifact, the user is essentially using a transferred session associated with the account that is associated with the identity service/portal/landing page, etc., (e.g., the account used to initially sign in at the first user device, e.g., user device 102a, as described above). The authentication application is configured to be utilized by the user for acquiring and/or automatic authentication of other, different software applications at the second user device. That is, the user may authenticate other software applications at the second user device via the authentication application.

Thus, in step 520, the user may initiate another software application at the second user device, and provide a login request for the other application to system 200 (e.g., to communication manager 216 and/or authenticator 214). In embodiments, the authentication application may provide credentials and/or an authentication object, e.g., a token or other object/artifact, with the login request, while in other embodiments, system 200 may provide a counter-request for authentication from the authentication application response to receiving the request. Received credentials and/or authentication objects for the other software application are used by authenticator 214 to validate the user for authentication to the other software application, allowing the user access thereto.

Figure 6:
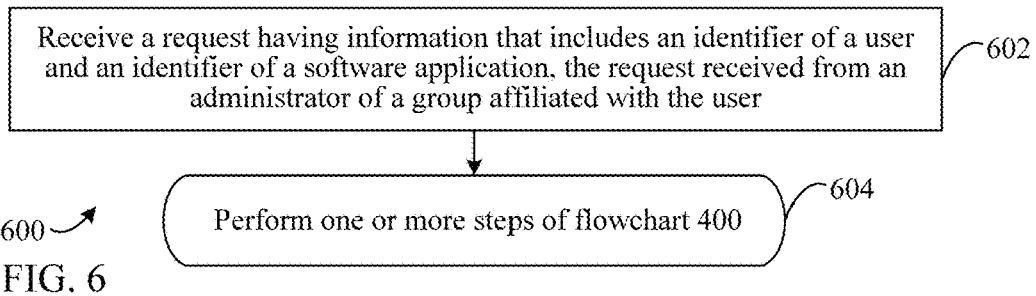
FIG. 6 shows a flowchart for authentication session transfer using application download links, in accordance with an example embodiment.

FIG. 6 shows a flowchart 600 for authentication session transfer using application download links, according to an example embodiment. Flowchart 600 may be a further embodiment of flow diagram 300 of FIG. 3. Flowchart 600 may be performed by system 200 of FIG. 2 and is described with respect thereto. Further structural and operational examples will be apparent to persons skilled in the relevant art(s) based on the following description.

Flowchart 600 is directed to an embodiment in which an administrator, via a device associated with the administrator, is signed in to an administrator authentication or identity service/application and desires to enable a user to acquire a software application for a device associated with the user (e.g., a mobile device or smartphone of the user). Flowchart 600 begins at step 602 and is described as follows.

In step 602, a request is received having information that includes an identifier of a user and an identifier of a software application, the request being received from an administrator of a group affiliated with the user. For instance, information that includes an identifier of a user and an identifier of a software application may be received from an administrator via administrator device 106 (which is associated with the administrator). As similarly noted above with respect to flow diagram 300 and flowchart 400, requests may include information associated with the user, the user's identity, the software application desired, and/or the like. An administrator may provide the request from an administrator console, described in further detail below in FIG. 13.

These administrator-initiated embodiments are applicable to different scenarios such as workplace scenarios, e.g., between an administrator or human resources staff member and first line worker users or enterprise users that need to acquire and access a software application on the user's first day of work. An administrator affiliated with the user, e.g., an administrator of the user's company, can use this mechanism to send the user a special link for the software application that will also sign the worker into their account on the user's phone. The administrator never has to give the user a username, password, or other credentials, and the user's credentials are hidden from the administrator. Similarly, a parent of a family may be an administrator in embodiments, and may be enabled to provide access to a software application to a child for a device associated with the child in this way. It is contemplated that these administrator-initiated embodiments are applicable to different types of groups (i.e., affiliations) in which one party of the group may control, provide, and/or permit another party of the group to acquire a software application and be automatically authenticated therefor based on session transfer.

In step 604, one or more steps of flowchart 400 of FIG. 4 are performed. That is, the described process for authentication session transfer using application download links in flowchart 400 may be performed wherein in flowchart 600 the initial request for the software application is received by the identity system from an administrator instead of the user herself.

By allowing such authentication session transfer using application download links, access to software applications via UIs is more efficiently and seamlessly performed, enabling users to navigate through authentication more quickly and without manual entry of credentials.

Embodiments herein, as noted above, also provide for the operations performed by user and administrator devices to facilitate authentication session transfer using application download links. Additional embodiments for user and administrator devices are provided below for FIGS. 7-12 (user devices) and FIG. 13 (administrator devices) which are described with respect to flow diagram 300 of FIG. 3. As a non-limiting example for illustration with respect to FIGS. 7-12, these Figures are describe in reference to a scenario in which a user utilizes a software application (OneDrive® from Microsoft Corporation of Redmond, Wash., in FIGS. 7-11; an authentication application in FIG. 12) at a desktop computer and desires to acquire and authenticate for access to the software application at a mobile device.

Figure 7:
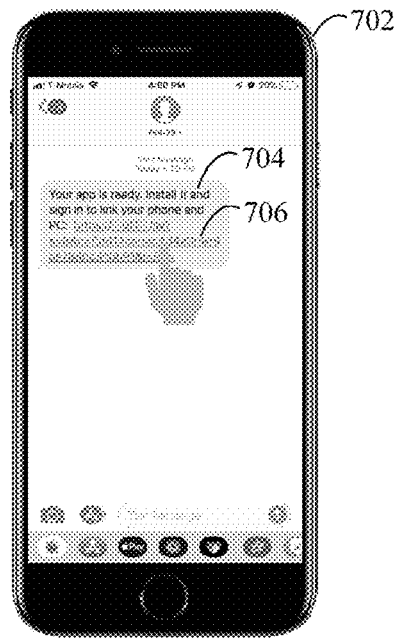
FIG. 7 shows a diagram of a system including a user device for authentication session transfer using application download links, in accordance with an example embodiment.

FIG. 7 shows a diagram of a system 700 including a user device 702 for authentication session transfer using application download links, in accordance with an example embodiment. User device 702 may be any type of user device associated with a user, including a mobile devices such as smartphones, as exemplarily illustrated. User device 702 includes a UI on which a communication message with a web link 704 is displayed for provision to the user having a URL 706. In embodiments, the display shown may correspond to the first URL and encoded objects provided by system 200 in step 314 of flow diagram 300. URL 706 includes a host/service identifier followed by representations of encrypted objects, as described herein, according to embodiments. The user is enabled to select the link with URL 706 to establish a first browser session for and provide the objects back to system 200, as described above in step 320 and step 322 of flow diagram 300 of FIG. 3. Thus, system 200 is enabled to authenticate the user and establish an authenticated browser session.

Figure 8:
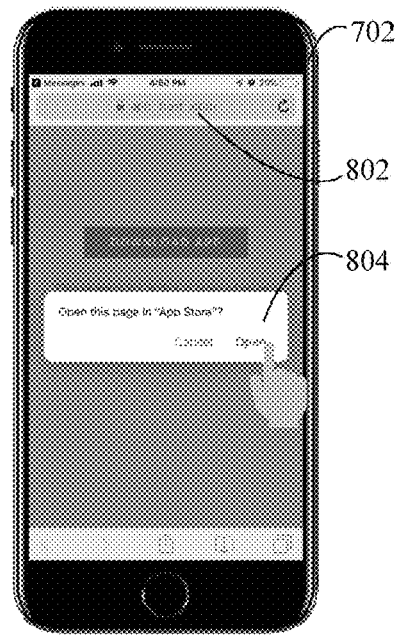
FIG. 8 shows a diagram of a system including the user device of FIG. 7 for authentication session transfer using application download links, in accordance with an example embodiment.

FIG. 8 shows a diagram of a system 800 including user device 702 of FIG. 7 for authentication session transfer using application download links, in accordance with an example embodiment. In FIG. 8, the UI of user device 702 displays a browsing session for another URL 802 of a host/service associated with an endpoint for software application acquisition. URL 802 displayed in system 800 may correspond to the second URL generated and provided by system 200 in step 336 and step 338 of flow diagram 300 for the second browser session at user device 702. The second browser session is initialized and redirected so that the browser navigates to URL 802. A selectable confirmation object 804 is displayed to enable user selection to confirm that the endpoint is desired for software application retrieval. Subsequently, the user is enabled to navigate the options at the end point to install the software application at user device 702 (e.g., step 344 of flow diagram 300) and then initialize the software application to sign in for access thereto. It should be noted that the redirect for URL 802 may cause a session artifact associated with the authenticated browser session to be provided for system 200 for later authentication to the software application.

Figure 9:
FIG. 9 shows a diagram of a system including the user device of FIG. 7 for authentication session transfer using application download links, in accordance with an example embodiment.

FIG. 9 shows a diagram of a system 900 including user device 702 of FIG. 7 for authentication session transfer using application download links, in accordance with an example embodiment. In FIG. 9, the UI of user device 702 displays a login screen with a selectable option 902 that enables the user to sign in for authentication to the software application at user device 702 (corresponding to step 354 of flow diagram 300). This login screen may be invoked by the software application and may be associated with the service/host that authenticated the user for the software application in step 302 and the first URL provided in step 314 of flow diagram 300. In this case, the sign in may be associated with the URL hosted by Microsoft Corporation to authenticate access to OneDrive® applications and accounts. When the user selects selectable option 902, a confirmation prompt may be displayed for authentication of the user for access to the software application as described further in FIG. 10.

Figure 10:
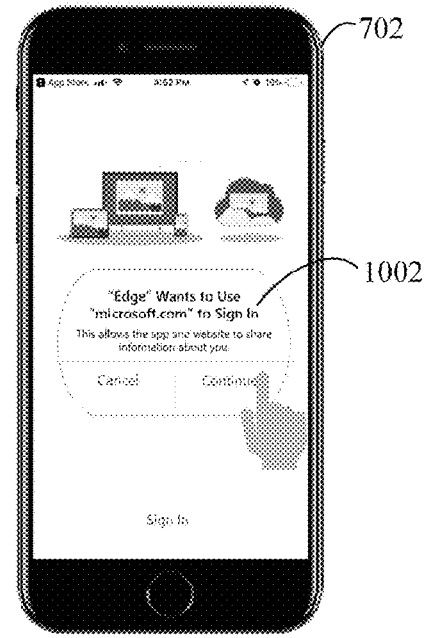
FIG. 10 shows a diagram of a system including the user device of FIG. 7 for authentication session transfer using application download links, in accordance with an example embodiment.

FIG. 10 shows a diagram of a system 1000 including user device 702 of FIG. 7 for authentication session transfer using application download links, in accordance with an example embodiment. In FIG. 10, the UI of user device 702 displays a confirmation prompt 1002 for authentication of the user for access to the software application. Confirmation by the user against confirmation prompt 1002 may cause the log in/authentication request for the software application to be provided to system 200, as in step 346 of flow diagram 300. As noted above, the session artifact associated with the authenticated browser session associated with the first URL that was dropped previously, may now be picked up by system 200 to authenticate the user for the software application executing at user device 702, as described with respect to step 352, step 354, and step 356 of flow diagram 300 in FIG. 3.

Figure 11:
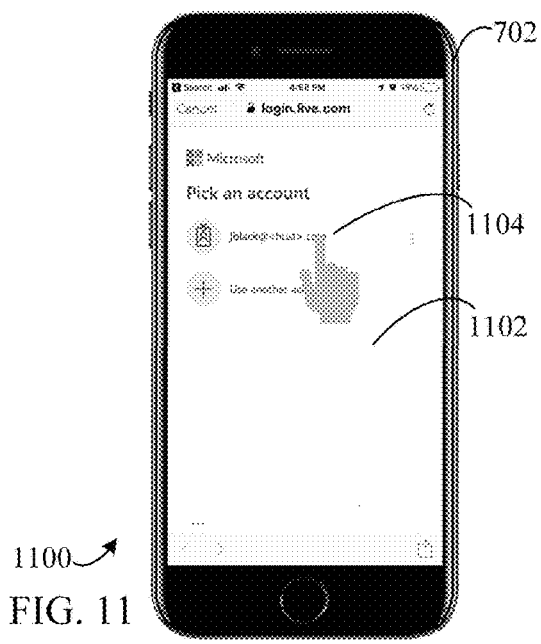
FIG. 11 shows a diagram of a system including the user device of FIG. 7 for authentication session transfer using application download links, in accordance with an example embodiment.

FIG. 11 shows a diagram of a system 1100 including user device 702 of FIG. 7 for authentication session transfer using application download links, in accordance with an example embodiment. In FIG. 11, the UI of user device 702 displays an account selection screen 1102 with a listing of one or more user accounts 1104. User accounts 1104 may list the specific user account with which the user authenticates herself for the software application (i.e., the account for the service/host that authenticated the user for the software application in step 302 and the first URL provided in step 314 of flow diagram 300). In this case, the specific user account in the list of user accounts 1104 may be associated with the URL hosted by Microsoft Corporation to authenticate access to OneDrive® applications and accounts. In embodiments, the account selection shown in system 1100 and the confirmation by the user against confirmation prompt 1002 may each be performed prior to the authentication is verified by system 200. That is, information regarding both of these actions may be provided to system 200 for authentication verification, as described elsewhere herein.

Figure 12:
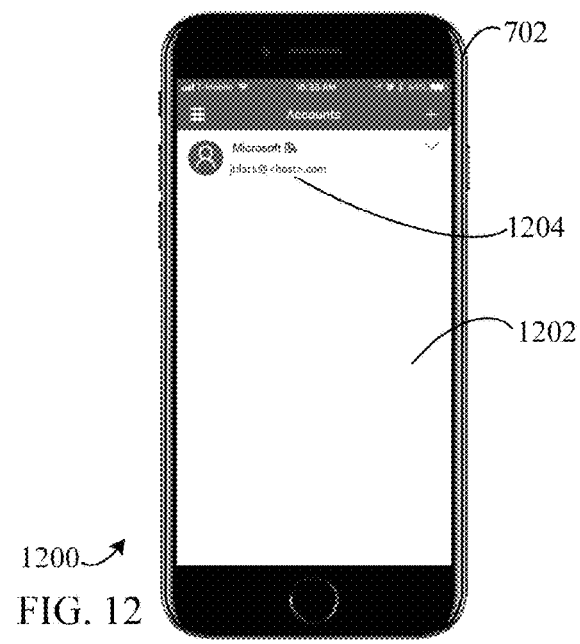
FIG. 12 shows a diagram of a system including the user device of FIG. 7 for authentication session transfer using application download links, in accordance with an example embodiment.

As noted above, FIG. 12 references embodiments where the software application corresponds to an authentication application, as described herein. FIG. 12 shows a diagram of a system 1200 including user device 702 of FIG. 7 for authentication session transfer using application download links, in accordance with an example embodiment. System 1200 illustrates that user device 702 displays a UI 1202 of the authentication application. As shown, UI 1202 provides a list of accounts 1204 of the user available via the authentication application for authentication of other software applications. In embodiments, the authentication application may provide UI 1202 to the user when another software application requires authentication. The user may select an appropriate account of list of accounts 1204 to use for the authentication, as described for step 354 and step 356 of flow diagram 300 in FIG. 3. Because the user accounts in list of accounts 1204 are validated as authenticated in the authentication application, system 200 may recognize a token or other authentication object provided from user device 702 via the authentication application using UI 1202 as sufficient for authentication for another software application and allow the user access thereto.

Figure 13:
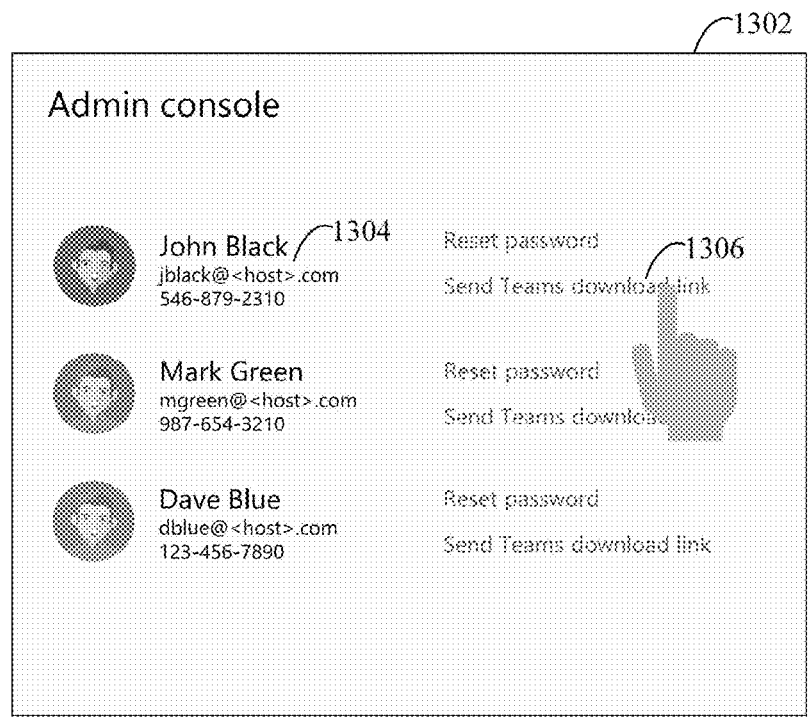
FIG. 13 shows a diagram of a system with an administrator interface for authentication session transfer using application download links, in accordance with an example embodiment.

As noted above, FIG. 13 references embodiments that correspond to administrator-initiated from administrator devices. FIG. 13 shows a diagram of a system 1300 with an administrator interface 1302 (or "console" 1302) for authentication session transfer using application download links, in accordance with an example embodiment. As described herein, an administrator via an associated device may initiate software application acquisition and authentication through authentication session transfer using application download links. In embodiments, administrator interface 1302 may utilize a mobile device management (MDM) protocol to perform its functions.

Administrator interface 1302, as shown for brevity and illustrative clarity, may present to an administrator a list of users and associated options 1306 to be performed for each user. A user entry 1304 is enumerated in administrator interface 1302, although the list of users may include any number of user entries, and may include user information associated with the first user in user entry 1304. The included user information may include a user name (e.g., "John Black"), a user picture or avatar, a user alias (e.g., "jblack"), communication identifiers such as email address and/or telephone numbers, a software application identifier (e.g., "Teams") and/or the like.

As noted above, FIG. 13 also shows associated options in which a request option 1306 to send a download link to the first user of user entry 1304 is enumerated. In this example, the administrator may be affiliated with the first user by both being employees of the same company, and the company may use Teams from Microsoft Corporation. Request option 1306 is shown as being selectable for providing the first user with a download link for this software application. Selecting request option 1306 provides the download link, or provides a request to system 200 that causes the download link to be provided, e.g., with a first URL that encodes an authentication object and a software application download object, as described in step 304 of flow diagram 300 of FIG. 3.

The examples above in this Section are illustrative in nature only, and are not to be considered limiting. It is contemplated that variations and equivalent implementations are encompassed by the embodiments as would be understood by persons of skill in the relevant art(s) having the benefit of this disclosure.

III. Example Mobile Device and Computing Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including system 100 of FIG. 1, system 200 of FIG. 2, system 700 of FIG. 7, system 800 of FIG. 8, system 900 of FIG. 9, system 1000 of FIG. 10, system 1100 of FIG. 11, system 1200 of FIG. 12, and system 1300 of FIG. 13, along with any components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 14:
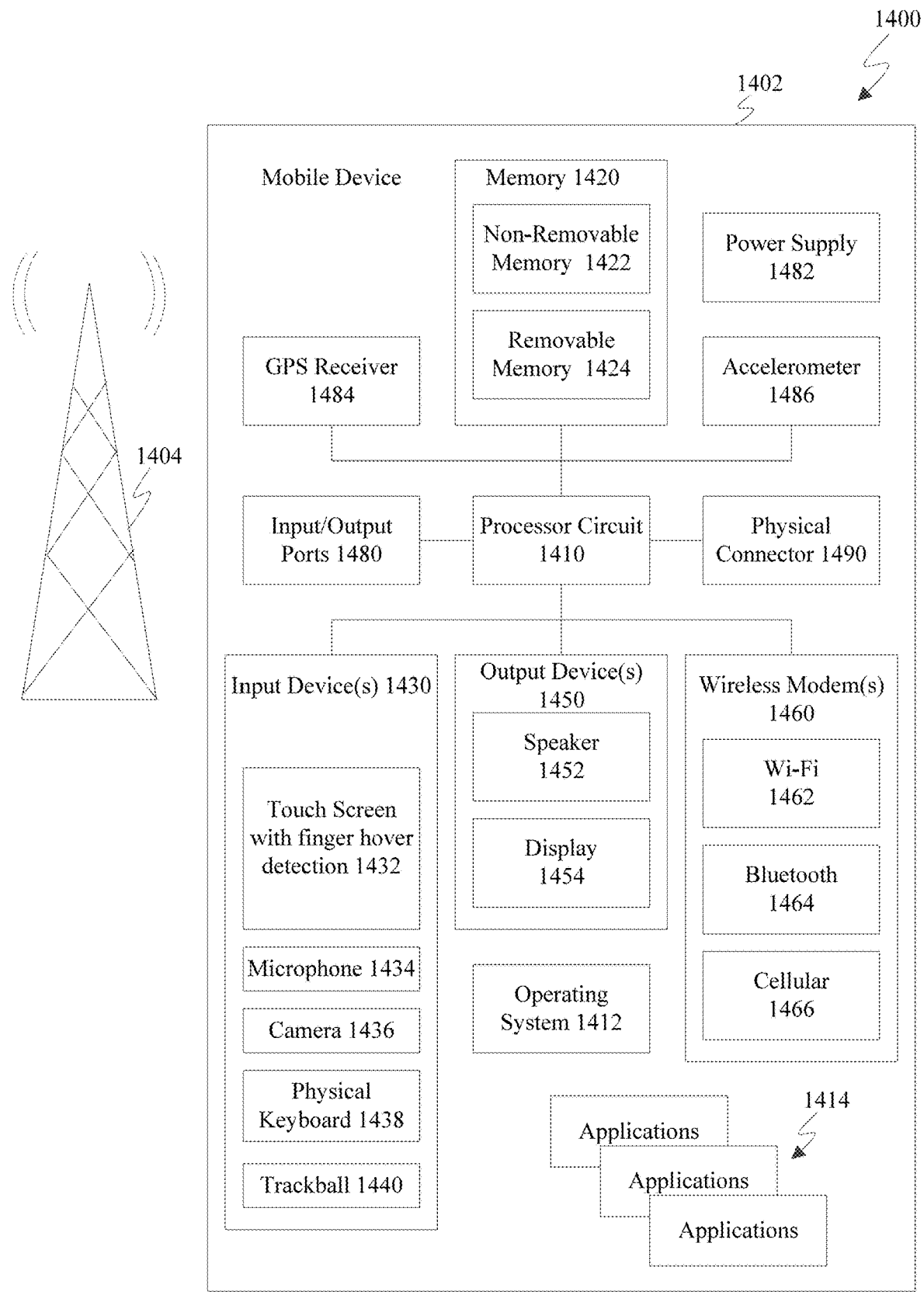
FIG. 14 shows a block diagram of an example mobile device that may be used to implement various example embodiments.

FIG. 14 is a block diagram of an exemplary mobile system 1400 that includes a mobile device 1402 that may implement embodiments described herein. For example, mobile device 1402 may be used to implement any system, client, or device, or components/subcomponents thereof, in the preceding sections. As shown in FIG. 14, mobile device 1402 includes a variety of optional hardware and software components. Any component in mobile device 1402 can communicate with any other component, although not all connections are shown for ease of illustration. Mobile device 1402 can be any of a variety of computing devices (e.g., cell phone, smartphone, handheld computer, Personal Digital Assistant (PDA), etc.) and can allow wireless two-way communications with one or more mobile communications networks 1404, such as a cellular or satellite network, or with a local area or wide area network.

Mobile device 1402 can include a controller or processor 1410 (e.g., signal processor, microprocessor, ASIC, or other control and processing logic circuitry) for performing such tasks as signal coding, data processing, input/output processing, power control, and/or other functions. An operating system 1412 can control the allocation and usage of the components of mobile device 1402 and provide support for one or more application programs 1414 (also referred to as "applications" or "apps"). Application programs 1414 may include common mobile computing applications (e.g., e-mail applications, calendars, contact managers, web browsers, messaging applications) and any other computing applications (e.g., word processing applications, mapping applications, media player applications).

Mobile device 1402 can include memory 1420. Memory 1420 can include non-removable memory 1422 and/or removable memory 1424. Non-removable memory 1422 can include RAM, ROM, flash memory, a hard disk, or other well-known memory devices or technologies. Removable memory 1424 can include flash memory or a Subscriber Identity Module (SIM) card, which is well known in GSM communication systems, or other well-known memory devices or technologies, such as "smart cards." Memory 1420 can be used for storing data and/or code for running operating system 1412 and application programs 1414. Example data can include web pages, text, images, sound files, video data, or other data to be sent to and/or received from one or more network servers or other devices via one or more wired or wireless networks. Memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1420. These programs include operating system 1412, one or more application programs 1414, and other program modules and program data. Examples of such application programs or program modules may include, for example, computer program logic (e.g., computer program code or instructions) for implementing one or more of system 100 of FIG. 1, system 200 of FIG. 2, system 700 of FIG. 7, system 800 of FIG. 8, system 900 of FIG. 9, system 1000 of FIG. 10, system 1100 of FIG. 11, system 1200 of FIG. 12, and system 1300 of FIG. 13, along with any components and/or subcomponents thereof, as well as the flowcharts/flow diagrams described herein, including portions thereof, and/or further examples described herein.

Mobile device 1402 can support one or more input devices 1430, such as a touch screen 1432, a microphone 1434, a camera 1436, a physical keyboard 1438 and/or a trackball 1440 and one or more output devices 1450, such as a speaker 1452 and a display 1454. Other possible output devices (not shown) can include piezoelectric or other haptic output devices. Some devices can serve more than one input/output function. For example, touch screen 1432 and display 1454 can be combined in a single input/output device. Input devices 1430 can include a Natural User Interface (NUI).

One or more wireless modems 1460 can be coupled to antenna(s) (not shown) and can support two-way communications between processor 1410 and external devices, as is well understood in the art. Modem 1460 is shown generically and can include a cellular modem 1466 for communicating with the mobile communication network 1404 and/or other radio-based modems (e.g., Bluetooth 1464 and/or Wi-Fi 1462). At least one wireless modem 1460 is typically configured for communication with one or more cellular networks, such as a GSM network for data and voice communications within a single cellular network, between cellular networks, or between the mobile device and a public switched telephone network (PSTN).

Mobile device 1402 can further include at least one input/output port 1480, a power supply 1482, a satellite navigation system receiver 1484, such as a Global Positioning System (GPS) receiver, an accelerometer 1486, and/or a physical connector 1490, which can be a USB port, IEEE 1394 (FireWire) port, and/or RS-232 port. The illustrated components of mobile device 1402 are not required or all-inclusive, as any components can be deleted and other components can be added as would be recognized by one skilled in the art.

In an embodiment, mobile device 1402 is configured to implement any of the above-described features of flowcharts herein. Computer program logic for performing any of the operations, steps, and/or functions described herein may be stored in memory 1420 and executed by processor 1410.

Figure 15:
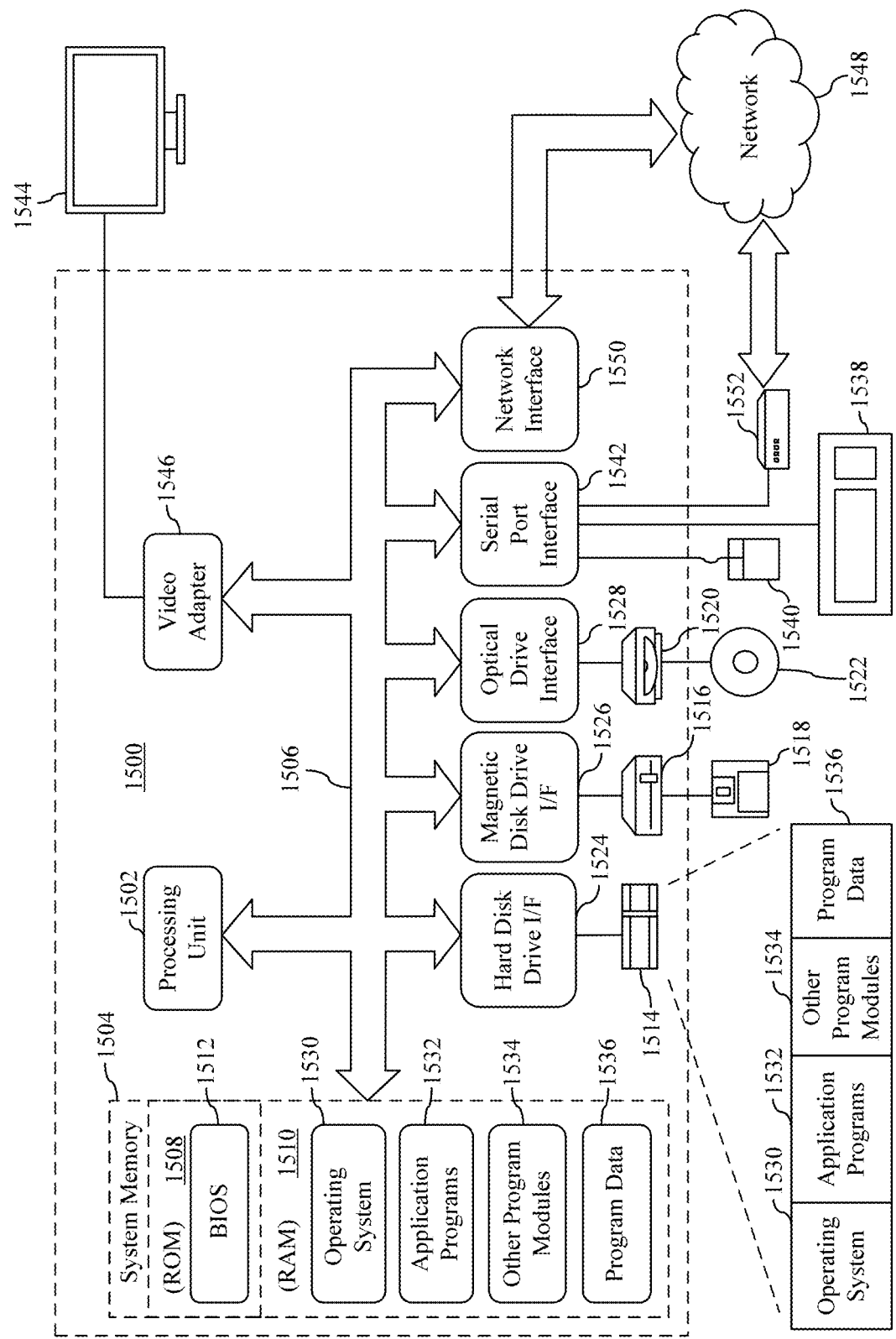
FIG. 15 shows a block diagram of an example computing device that may be used to implement embodiments.

FIG. 15 depicts an exemplary implementation of a computing device 1500 in which embodiments may be implemented. For example, embodiments described herein may be implemented in one or more computing devices similar to computing device 1500 in stationary or mobile computer embodiments, including one or more features of computing device 1500 and/or alternative features. The description of computing device 1500 provided herein is provided for purposes of illustration, and is not intended to be limiting. Embodiments may be implemented in further types of computer systems and/or game consoles, etc., as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing embodiments described herein, such as system 100 of FIG. 1, system 200 of FIG. 2, system 700 of FIG. 7, system 800 of FIG. 8, system 900 of FIG. 9, system 1000 of FIG. 10, system 1100 of FIG. 11, system 1200 of FIG. 12, and system 1300 of FIG. 13, along with any components and/or subcomponents thereof, as well as the flowcharts/flow diagrams described herein, including portions thereof, and/or further examples described herein.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, virtual keyboard, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including memory 1520 of FIG. 15). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1542, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Examples and Advantages

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

In some cases, a mobile device management (MDM) protocol may be utilized in conjunction with the embodiments described herein to perform operations for authentication session transfer using application download links.

While embodiments described in the Sections above may be described in the context of examples for illustrative clarity and ease of description, the embodiments herein are not so limited and may also be applied through different types of devices, for different users or groups of users, different identity hosts, different application hosts/stores, and/or the like.

Furthermore, the described embodiments do not exist in software implementations for authentication session transfer using application download links. Conventional solutions lack the ability to increase efficiency and ease of authentication for software applications via a UI through authentication session transfer using application download links where a user is not required to manually enter authentication credentials. The UI improvements described herein for authentication also provide further increases for identity information security as user credentials are not shared with third parties during the acquisition or authentication processes.

The additional examples and embodiments described in this Section may be applicable to examples disclosed in any other Section or subsection of this disclosure.

A system is described herein. The system may be configured and enabled in various ways for authentication session transfer using application download links, as described herein. The system includes processing system with one or more processors and a memory that stores program code to be executed by the processing system. The program code includes an object generator configured to receive a request having information that includes an identifier of a user and an identifier of a software application, and generate an authentication object associated with an identity of the user. The program code also includes a uniform resource locator (URL) generator configured to generate a first URL that encodes an authentication object, and provide the first URL to a device associated with the user. The program code also includes an authenticator, associated with the first URL, configured to receive the authentication object from the device associated with the user subsequent to the first URL being provided, and authenticate the identity of the user for the software application based on the authentication object being received.

In an embodiment of the system, the authenticator is configured to receive the authentication object via a first browser session instantiated responsive to activation of the first URL at the device associated with the user, establish an authenticated browser session with the device associated with the user based at least on the authentication object, and authenticate the identity of the user for the software application responsive to the software application invoking the authenticated browser session at the device associated with the user.

In an embodiment of the system, the object generator is configured to generate an application download object that specifies a redirection to a second browser session for a download website or an application store for the software application based on the information, wherein the first URL encodes the application download object associated with the software application. In the embodiment, the URL generator is further configured to generate a second URL, based on the application download object, that specifies a redirection to a second browser session for a download website or an application store for the software application, and provide the second URL.

In an embodiment of the system, the authenticator is further configured to receive a session artifact from the device that is generated in association with the redirection to the second browser session, and authenticate the identity of the user for the software application based on the session artifact.

In an embodiment of the system, the URL generator is further configured to provide the second URL to at least one of the device or a different device associated with the user, and the second URL is provided as at least one of a web link, a quick response (QR) code, a sub-audio frequency communication, a near-field communication (NFC), a radio frequency (RF) communication, or a Bluetooth communication.

In an embodiment of the system, the authenticator is further configured to receive a session artifact from the device that is generated in association with the redirection to the second browser session, and authenticate the identity of the user for the software application based on the session artifact.

In an embodiment of the system, the information includes at least one of a communication identifier, a name of the user, an alias of the user, or a software application identifier.

In an embodiment of the system, the authenticator is configured to receive the authentication object from the device associated with the user based on the software application consuming and then providing the authentication object to the authenticator.

A method implemented by a computing system is also described herein. The method may be for authentication session transfer using application download links, as described herein. The method includes validating user credentials received over a network from a first device associated with a user, and receiving over the network a user input specifying a communication identifier. The method also includes providing, over the network to a second device associated with the user that is associated with the communication identifier, a first uniform resource locator (URL) that is generated by the computing system and that encodes an authentication object associated with an identity of the user, and receiving the authentication object over the network from the second device subsequent to the first URL being provided. The method further includes authenticating the identity of the user for the software application based on the authentication object being received, and authenticating the identity of the user for another software application at the second device based on an authentication token received over the network from the software application executing at the second device.

In an embodiment, the method includes receiving over the network the authentication object via a first browser session instantiated responsive to activation of the first URL at the second device, establishing an authenticated browser session with the second device based at least on the authentication object, and authenticating the identity of the user for the software application subsequent to the software application invoking the authenticated browser session at the second device.

In an embodiment, the method includes generating the application download object and an application download object that specifies a redirection to a second browser session for a download website or an application store for the software application based on the information, wherein the first URL also encodes the application download object, generating a second URL, based on the application download object, that specifies a redirection to a second browser session for a download website or an application store for the software application, and providing the second URL to the second device as a web link to the second device.

In an embodiment, the method includes receiving a session artifact from the second device that is generated in association with the redirection for the second browser session, and authenticating the identity of the user for the software application based on the session artifact.

In an embodiment of the method, receiving over the network the user input includes receiving a request to install the software application, and generating the application download object and the authentication object based on the request.

In an embodiment of the method, the computing system is a cloud-based computing system, and comprises an identity service that is configured to perform authentication for identities of users.

In an embodiment of the method, establishing the authenticated browser session is also based on receiving over the network from the first device a response to a secondary authentication challenge provided to the second device.

A computer-readable storage medium having program instructions recorded thereon that, when executed by a processing device, perform a method, is also described. The method may be for authentication session transfer using application download links, as described herein. The method includes receiving a request having information that includes an identifier of a user and an identifier of a software application, the request received from an administrator of a group affiliated with the user, generating a first URL that encodes an authentication object associated with an identity of the user, and providing the first URL to a device associated with the user. The method also includes receiving the authentication object from the device associated with the user subsequent to the first URL being provided, and authenticating the identity of the user for the software application based on the authentication object being received.

In an embodiment of the computer-readable storage medium, the method includes receiving the authentication object via a first browser session instantiated responsive to activation of the first URL at the device associated with the user, establishing an authenticated browser session with the device associated with the user based at least on the authentication object, and authenticating the identity of the user for the software application responsive to the software application invoking the authenticated browser session at the device associated with the user.

In an embodiment of the computer-readable storage medium, the first URL encodes an application download object associated with the software application, and the method further includes generating a second URL, based at least on the application download object, that specifies a redirection to a second browser session for a download website or an application store for the software application, and providing the second URL.

In an embodiment of the computer-readable storage medium, providing the second URL incudes providing the second URL to at least one of the device or a different device associated with the user, and the second URL is provided as at least one of a web link, a quick response (QR) code, a sub-audio frequency communication, a near-field communication (NFC), a radio frequency (RF) communication, or a Bluetooth communication.

In an embodiment of the computer-readable storage medium, the method further includes receiving a session artifact from the device that is generated in association with the redirection to the second browser session, and authenticating the identity of the user for the software application based on the session artifact.

In an embodiment of the computer-readable storage medium, the method further includes generating an application download object that specifies a redirection to a second browser session for a download website or an application store for the software application, and the authentication object, based on the information.

In an embodiment of the computer-readable storage medium, the information includes a communication identifier, and providing the first URL to the device includes providing based at least on the communication identifier.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A system, comprising:
   a processing system comprising one or more processors; and
   a memory configured to store program code to be executed by the processing system, the program code including:
      an object generator configured to:
         receive information associated with a user that includes at least one identifier; and
         generate an authentication object associated with an identity of the user;
      a uniform resource locator (URL) generator configured to:
         generate a first URL that encodes the authentication object; and
         provide the first URL to a device associated with the user; and
      an authenticator, associated with the first URL, configured to:
         receive the authentication object from the device associated with the user subsequent to the first URL being provided, and based at least on a software application at the device consuming and then providing the authentication object to the authenticator; and
         authenticate the identity of the user for the software application at the device based on the authentication object being received.

2. The system of claim 1, wherein the authenticator is configured to:
   receive the authentication object via a first browser session instantiated responsive to activation of the first URL at the device associated with the user;
   establish an authenticated browser session with the device associated with the user based at least on the authentication object; and
   authenticate the identity of the user for the software application responsive to the software application invoking the authenticated browser session at the device associated with the user.

3. The system of claim 2, wherein the object generator is configured to:
   generate an application download object that specifies a redirection to a second browser session for a download website or an application store for the software application based on the information, wherein the first URL encodes the application download object associated with the software application; and
   wherein the URL generator is further configured to:
   generate a second URL, based on the application download object, that specifies a redirection to a second browser session for a download website or an application store for the software application; and
   provide the second URL.

4. The system of claim 3, wherein the URL generator is further configured to:
   provide the second URL to at least one of the device or a different device associated with the user, and
   wherein the second URL is provided as at least one of a web link, a quick response (QR) code, a sub-audio frequency communication, a near-field communication (NFC), a radio frequency (RF) communication, or a Bluetooth communication.

5. The system of claim 3, wherein the authenticator is further configured to:
receive a session artifact from the device that is generated in association with the redirection to the second browser session; and
authenticate the identity of the user for the software application based on the session artifact.

6. The system of claim 1, wherein the at least one identifier included with the information includes at least one of:
a communication identifier;
a name of the user;
an alias or another identifier of the user; or
an identifier of the software application.

7. The system of claim 1, wherein the software application consuming and then providing the authentication object to the authenticator is an application being installed at the device.

8. A method implemented by a computing system, the method comprising:
validating user credentials received over a network from a first device associated with a user;
receiving over the network a user input specifying a communication identifier;
providing, over the network to a second device associated with the user that is associated with the communication identifier, a first uniform resource locator (URL) that is generated by the computing system and that encodes an authentication object associated with an identity of the user;
receiving the authentication object over the network from the second device subsequent to the first URL being provided;
authenticating the identity of the user for the software application based on the authentication object being received; and
authenticating the identity of the user for another software application at the second device based on an authentication token received over the network from the software application executing at the second device.

9. The method of claim 8, further comprising:
receiving over the network the authentication object via a first browser session instantiated responsive to activation of the first URL at the second device;
establishing an authenticated browser session with the second device based at least on the authentication object; and
authenticating the identity of the user for the software application subsequent to the software application invoking the authenticated browser session at the second device.

10. The method of claim 9, further comprising:
generating the authentication object and an application download object that specifies a redirection to a second browser session for a download website or an application store for the software application based on the information, wherein the first URL also encodes the application download object;
generating a second URL, based on the application download object, that specifies a redirection to a second browser session for a download website or an application store for the software application; and
providing the second URL to the second device as a web link to the second device.

11. The method of claim 10, further comprising:
receiving a session artifact from the second device that is generated in association with the redirection for the second browser session; and
authenticating the identity of the user for the software application based on the session artifact.

12. The method of claim 10, wherein receiving over the network the user input comprises:
receiving a request to install the software application; and
generating the application download object and the authentication object based on the request.

13. The method of claim 9, wherein establishing the authenticated browser session is also based on receiving over the network from the first device a response to a secondary authentication challenge provided to the second device.

14. The method of claim 8, wherein the computing system is a cloud-based computing system, and comprises an identity service that is configured to perform authentication for identities of users.

15. A computer-readable storage medium having program instructions recorded thereon that, when executed by at least one processing device, configure the at least one processing device to perform a method, the method comprising:
receiving a request having information that includes an identifier of a user and an identifier of a software application, the request received from an administrator of a group affiliated with the user;
generating a first URL that encodes an authentication object associated with an identity of the user;
providing the first URL to a device associated with the user;
receiving the authentication object from the device associated with the user subsequent to the first URL being provided; and
authenticating the identity of the user for the software application based on the authentication object being received.

16. The computer-readable storage medium of claim 15, wherein the method comprises:
receiving the authentication object via a first browser session instantiated responsive to activation of the first URL at the device associated with the user;
establishing an authenticated browser session with the device associated with the user based at least on the authentication object; and
authenticating the identity of the user for the software application responsive to the software application invoking the authenticated browser session at the device associated with the user.

17. The computer-readable storage medium of claim 16, wherein the first URL encodes an application download object associated with the software application; and
wherein the method further comprises:
generating a second URL, based at least on the application download object, that specifies a redirection to a second browser session for a download website or an application store for the software application; and
providing the second URL.

18. The computer-readable storage medium of claim 17, wherein providing the second URL comprises:
providing the second URL to at least one of the device or a different device associated with the user, and
wherein the second URL is provided as at least one of a web link, a quick response (QR) code, a sub-audio frequency communication, a near-field communication (NFC), a radio frequency (RF) communication, or a Bluetooth communication.

19. The computer-readable storage medium of claim 17, wherein the method further comprises:
   receiving a session artifact from the device that is generated in association with the redirection to the second browser session; and
   authenticating the identity of the user for the software application based on the session artifact.

20. The computer-readable storage medium of claim 17, wherein the method further comprises:
   generating an application download object that specifies a redirection to a second browser session for a download website or an application store for the software application, and the authentication object, based on the information.

* * * * *